United States Patent [19]

Yamada et al.

[11] Patent Number: 5,482,797

[45] Date of Patent: Jan. 9, 1996

[54] NONAQUEOUS SECONDARY BATTERY

[75] Inventors: Kazuo Yamada; Hideaki Tanaka, both of Nara; Tetsuya Yoneda, Nabari; Takehito Mitate, Yamatotakada; Hiroyuki Kitayama, Tenri, all of Japan

[73] Assignee: Sharp Kabushiki Kaisha, Osaka, Japan

[21] Appl. No.: 196,032

[22] Filed: Feb. 14, 1994

[30] Foreign Application Priority Data

Feb. 16, 1993 [JP] Japan .................................. 5-026596

[51] Int. Cl.⁶ .................................................. H01M 4/02
[52] U.S. Cl. ............................................ 429/218; 429/232
[58] Field of Search ...................................... 429/218, 232

[56] References Cited

U.S. PATENT DOCUMENTS

| | | | |
|---|---|---|---|
| 4,835,075 | 5/1989 | Tajima et al. | 429/194 |
| 4,863,814 | 9/1989 | Mohriet et al. | 429/60 |
| 4,863,818 | 9/1989 | Yoshimoto et al. | 429/218 |
| 4,978,600 | 12/1990 | Suzuki et al. | 429/218 |
| 5,028,500 | 7/1991 | Fong et al. | 429/194 |
| 5,030,529 | 7/1991 | Wada et al. | 429/209 |
| 5,244,757 | 9/1993 | Takami et al. | 429/194 |
| 5,350,648 | 9/1994 | Kagawa et al. | 429/218 |

FOREIGN PATENT DOCUMENTS

| | | |
|---|---|---|
| 62-122066 | 6/1987 | Japan . |
| 63-24555 | 2/1988 | Japan . |
| 63-213267 | 9/1988 | Japan . |
| 1-204361 | 8/1989 | Japan . |
| 3-252053 | 11/1991 | Japan . |
| 3-285273 | 12/1991 | Japan . |
| 3-289068 | 12/1991 | Japan . |

OTHER PUBLICATIONS

*Carbon Material Experiment Technique 1*, pp. 55–63.

Primary Examiner—Stephen Kalafut
Assistant Examiner—Richard H. Lilley, Jr.
Attorney, Agent, or Firm—David G. Conlin; Linda M. Buckley

[57] ABSTRACT

A nonaqueous secondary battery comprising a cathode, an anode and a nonaqueous electrolyte disposed and sealed between the cathode and the anode wherein the anode is made of a carbon material as its active material, in which the carbon material comprises a fine core particle of a metal or an alloy thereof, and a carbon layer which is arranged and stacked in an onion-like shell configuration centering on the fine core particle, at least part of the carbon layer having a crystal structure in which graphite-like layers are stacked and the fine core particle having an average diameter of about 10 to 150 nm.

7 Claims, 4 Drawing Sheets

NONAQUEOUS SECONDARY BATTERY

BACKGROUND OF THE INVENTION

1. Field of the Invention

The present invention relates to nonaqueous secondary batteries. More particularly it relates to a nonaqueous secondary battery using a carbon material as an anode.

2. Description of the Related Art

Along with the reduction in the size of electronic apparatus and conservation of electric power, a stronger demand is made on creating a secondary battery of an alkali metal type having a high energy density in which an alkali metal such as lithium or the like is used. However, when an alkali metal is used in an anode, batteries using a lithium metal, for example, there is a drawback in that a repetition of charging and discharging cycles produces a dendrite on the lithium metal thereby causing an internal short circuit in batteries. On the other hand, a lithium/aluminum alloy has been proposed as a substitute for the lithium metal. Use of the alloy suppresses the generation of a dendrite. However such batteries using the alloy as an anode have a short cycle life in the deep discharge depth. Thus no essential improvement is made. Consequently attention focussed on a carbon material excellent in cycle properties and safety, which material permits lithium to be intercalated and deintercalated in the form of an ion, in particular, a certain kind of carbon material in which lithium is intercalated to form an interlayer compound is accompanied by an electrochemical reaction such as intercalation and deintercalation of lithium ions in an organic electrolyte including a lithium salt thus enabling a reversible oxidation-reduction reaction. Carbon materials are quite promising for use as an anode of lithium secondary batteries. Thus intense study has been made of secondary batteries using carbon materials.

Carbon has various forms because graphite-like planes are expanded in two dimensions and stacked in various ways. Thus it is possible to obtain various carbons depending on starting materials and production methods. Carbons can be classified into several groups from the viewpoint of orientation state or fine structure thereof. They include random orientation microtexture in which graphite-like layers are stacked at random, a planar orientation microtexture in which graphite-like layers are oriented along a reference plane, an axial orientation microtexture in which graphite-like layers are oriented along an axis (including coaxial cylindrical structures in which graphite-like layers are cylindrically oriented relative to a reference axis, and radial structure in which graphite-like layers are radially oriented relative to a reference axis), and a point orientation microtexture in which graphite-like layers are stacked around a reference point (including concentric structures in which graphite-like layers are spherically oriented relative to a reference point though not in a complete texture, a radial structure in which graphite-like layers are radially oriented relative to a reference point). It is known that carbon having the same interlayer spacing has a different function owing to differences in arrangement of graphite-like layers.

When carbon is used as an anode active material, the quantity of lithium inserted between carbon layers is one lithium atom relative to six carbon atoms, namely $C_6Li$ at most. Thus the theoretical capacity of carbon per unit weight is 372 mAh/g.

Carbon materials conventionally used as an anode are disclosed in Japanese Laid-Open Patent No. SHO. 62-90863, Japanese Laid-Open Patent No. SHO. 62-122066, Japanese Laid-Open Patent No. SHO 63-213267, Japanese Laid-Open Patent No. HEI. 1-204361, Japanese Laid-Open Patent No.HEI. 2-82466, Japanese Laid-Open Patent No. HEI. 3-252053, Japanese Laid-Open Patent No. HEI. 3-285273 and Japanese Laid-Open Patent No. HEI. 3-289068. The carbon material disclosed in these patent publications does not exhibit a sufficient capacity in the potential range in that can be used as an actual battery, because of a linear increase in potential during the deintercalation of lithium, even if the carbon material has a certain capacity as seen from cokes used as a electrode material. When an electrode is manufactured by using a carbon material, bulk density is an important factor although a real density is also required. Since the shape and size of carbon particles provide the bulk density, it is difficult to raise the capacity density per unit volume with a fibrous carbon as shown in the embodiment of Japanese Laid-Open Patent No. SHO. 62-90863, Japanese Laid-Open Patent No. HEI. 2-82466, Japanese Laid-Open Patent No. HEI. 285273, and Japanese Laid-Open Patent No. HEI. 3-289068. On the other hand, a pyrolytic carbon prepared by the CVD technique as disclosed in Japanese Laid-Open Patent No. SHO. 63-24555 exhibits a high charge and discharge stability. It is, however, difficult to make a thick film electrode and to obtain a large capacity electrode with that method. Then as shown in Japanese Laid-Open Patent No. HEI. 4-296448, deposited carbon is stripped and ground into powders. Such powders are thought to provide a thick film in film forming processes. However, these powders are not suitable for use in such processes, because the carbon is flaky and stripping deposited carbon is troublesome in production.

Furthermore, as seen in Japanese Laid-Open Patent No. 63-230512, a powdered graphite cannot provide sufficient capacity as an active material of batteries because no orientation graphite-like layer is observed. Furthermore, metal particles in the center and carbon particles are large, although carbon deposits on the surface of metal at the center of on-ion-like structure in such a manner that carbon covers the surface of the metal.

Thus it is not possible to obtain with carbon materials disclosed in the above patent publications carbon electrodes that can be practically used. Consequently it is difficult to obtain a satisfactory capacity with nonaqueous secondary batteries.

Accordingly the present invention is intended to overcome the above described unfavorable conditions.

SUMMARY OF THE INVENTION

An object of the present invention is to provide a large capacity nonaqueous secondary battery by developing a carbon material having a large intercalation amount of lithium.

Accordingly the present invention provides a nonaqueous secondary battery comprising a cathode, an anode and a nonaqueous electrolyte disposed and sealed between a cathode and an anode wherein the anode is made of a carbon material in which the carbon material comprises a fine core particle of a metal or an alloy thereof, and a carbon layer which is arranged and stacked in an onion-like shell texture centering on the fine core particle, at least part of the carbon layer having a crystal structure in which graphite-like layers are stacked and the fine core particle have an average diameter of about 10 to 150 nm.

BRIEF DESCRIPTION OF THE DRAWINGS

The present invention will be detailed by way of the accompanying drawings but they are not intended to limit the scope of the present invention.

DETAILED DESCRIPTION OF PREFERRED EMBODIMENTS

For the cathode of the nonaqueous battery of the present invention can be used such active materials as $Li_xM_yN_zO_2$ (wherein M is either of Fe, Co or Ni, N is a transition metal, 4B group or 5B group metal, and x, y, z represent either 0 or a positive number), $LiMnO$, $MnO_2$, $V_2O_5$, amorphous-$V_2O_5$, $TiS_2$, $FeOCl$, polyaniline, polypyrrol, polythiophene, polyacethylene, polyphenylene or the like. Part of these cathodes can be formed by admixing a conductive material and/or binder, or solid electrolyte in some cases. The mixing ratio can be defined as 100 wt.pts. of an active material as opposed to 5 to 50 wt.pts. of conductive material, and 1 to 30 wt.pts. of binder. Examples of the conductive materials include carbons like carbon blacks (such as acetylene black, thermal black, channel black or the like), graphite powders and metal powders to which the conductive material is not restricted. Examples of the binders include without limitation fluorine polymers such as polytetrafluoroethylene, or polyvinyldene fluoride and polyolefins such as polyethylene or polypropylene.

In the anode of the battery of the present invention, the carbon material is an active material which can intercalate and deintercalate $Li^+$.

Figure 5:
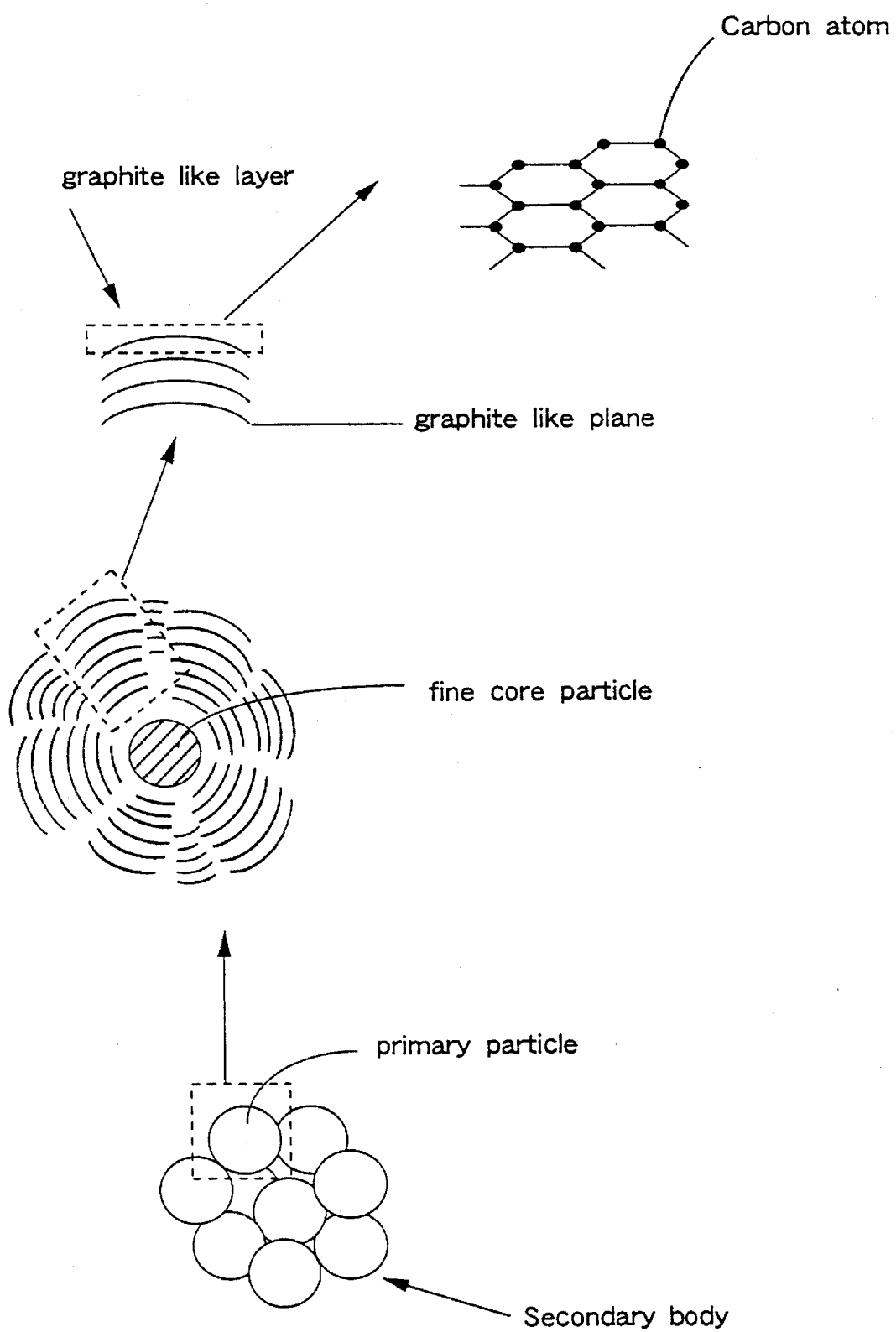
FIG. 5 is a diagram illustrating the structure of a carbon material of the present invention.

In accordance with the present invention, carbon atoms are regularly arranged to form a carbon layer having graphite-like planes as shown in FIG. 5. These graphite-like planes are arranged and stacked in an onion-like shell microtexture around the fine core particles. The graphite-like layer in which graphite-like planes are arranged in an onion-like structure are arranged in a concentric manner relative to the fine core particles.

A study on the fine structures of this onion-like carbon material shows that the following three factors are extremely important improving the discharge capacity of batteries. In other words, the carbon material with a favorable charge and discharge capacity has the following morphological characteristics.

1. The carbon material contains particles having an approximately spherical in configuration and graphite-like layers arranged in a concentric spherical microtexture. Preferably particles have cores approximately at the center thereof.

2. The carbon material, which is an accumulation of particles, has an average diameter of 40 to 200 nm or less. Particles may form an aggregation, i.e., an aggregation having a size preferably ranging between 0.1 to 80 μm.

3. The crystal structure thereof is incomplete compared with graphite crystal structure. The mean of interlayer spacing of the (002) plane when the carbon material is measured with the X-ray wide angle method, the crystal size of the (002) plane and the (110) plane are large enough for a lithium ion to occupy a sufficient amount for intercalation and deintercalation.

One particle of this onion-like microtexture constitutes a primary particle, which aggregates in plural numbers to form a secondary body. Preferably the primary particles of the carbon material have an average diameter of 40 to 200 nm. Furthermore when these particles form an aggregation, i.e., a secondary body, preferably the size may be about 0.1 to 80 μm. When the average diameter of the primary particles of the carbon material becomes larger than 200 nm, the efficient area of contact with the electrolyte in an electrode reaction becomes relatively small so that the charge and discharge power of batteries including such larger particles is small. In addition, when the average diameter of the primary particles of the carbon material become smaller than 40 nm, the lithium ion cannot occupy a sufficient place therein. Thus the battery cannot obtain a large capacity relative to the unit weight.

Figure 3:
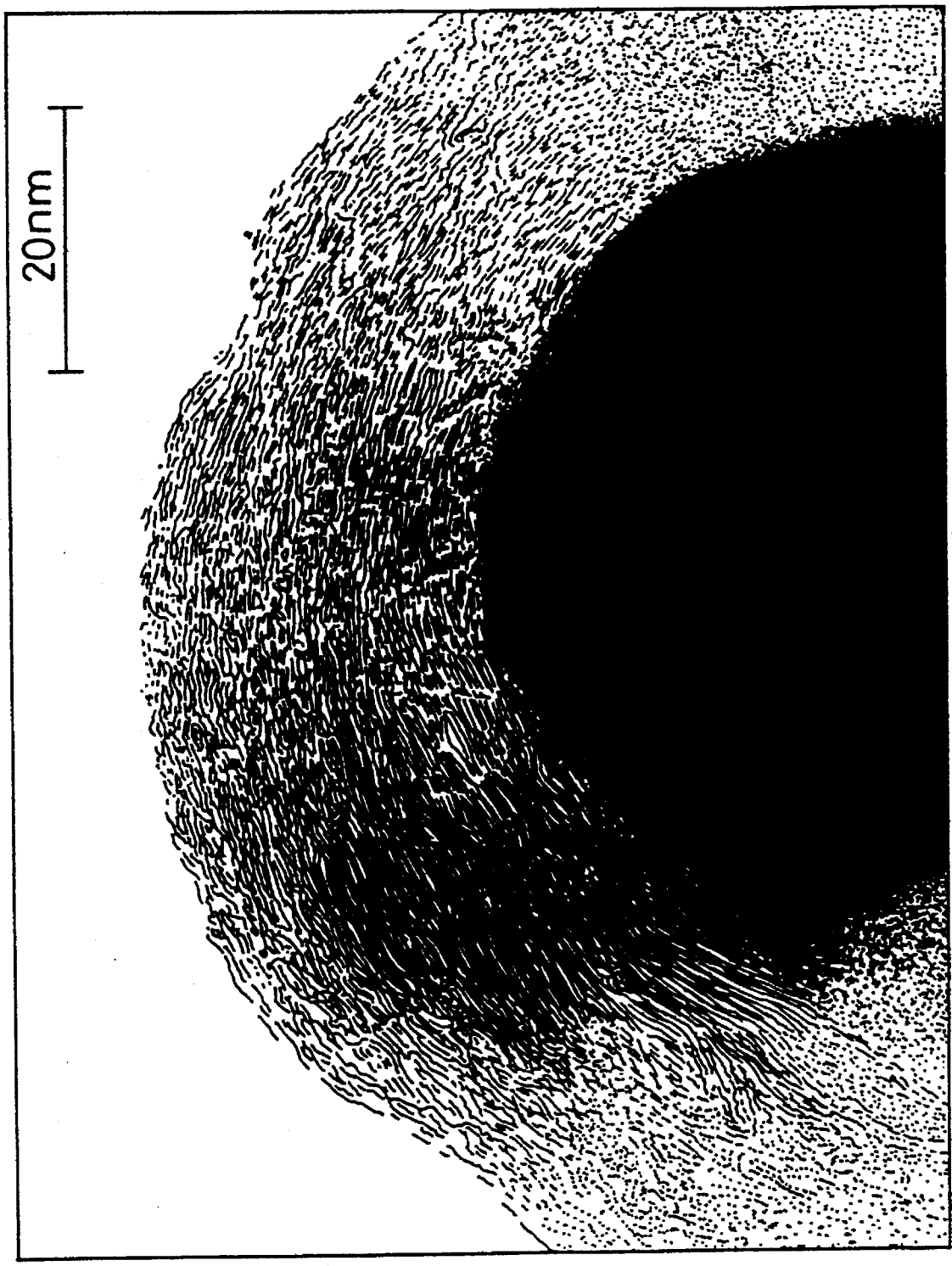
FIG. 3 is a TEM micrograph of a carbon material having a concentric and spherical structure (onion-like structure) centering on nickel and prepared in accordance with an example of the present invention.

The carbon material of the present invention can be used of a starting material of a gas-like or a dewdrop-like state on a sample base where a metal, its alloy or compound which has the catalytic action of the metal to be fine core particles, is present. Thus the carbon material forms an approximately spherical structure with the core placed approximately at the center. An observation of the carbon material with an electron microscope shows that layers of graphite-like layers are arranged in a concentric configuration to form a concentric spherical structure (onion-like structure). These structures form the primary particles. Otherwise they form an aggregation of the primary particles having a concentric spherical structure. Here the concentric spherical structure comprises a spherical shell-like arrangement of graphite-like layers of carbon centering on VIII element included in the center thereof (see FIG. 3).

Preferably, as for the carbon in the carbon material, the mean of interlayer spacing of the (002) plane ranges about 0.336 to 0.360 nm, the crystallite size (Lc) in the from (002) direction ranges from about 5 to 20 nm, and the crystallite size (La) in the (110) direction ranges from about 10 to 25 nm. In the carbon material thus containing fine core particles at the center thereof a catalytic action is observed in the pyrolysis of hydrocarbons thus providing the carbon material with a high crystallinity while maintaining the same spherical structure. Since the mean of interlayer spacing is narrow, a low charge-discharge potential can be maintained at the intercalation and deintercalation of lithium. Furthermore, it seems that since the crystallite size is considerably large, the site where lithium intercalates or deintercalates increases to give a large capacity. Still further, graphite-like layers are arranged in a concentric spherical configuration, the (002) plane pro,iced by the intercalation and deintercalation of lithium has a favorable resistance against contraction and expansion. Thus the use of the carbon material of the present invention provides a secondary battery with a large capacity and excellent cycle properties.

The method for preparing a carbon material containing the above fine particles at the center thereof is exemplified as follows.

Hydrocarbons or the derivatives thereof that are used for preparing the carbon material may be any of aliphatic hydrocarbons, aromatic hydrocarbons or cycloaliphatic hydrocarbons. They include benzene, toluene, xylene, naphthalene, anthracene, pylene, pyridine, allylbenzene, hexamethylbenzene, aniline, phenol, 1,2-dibromoethylene, 2-butine, methane, ethane, propane, butane, pentane, hexane, cyclohexane, acethylene, ethylene, pentene, propene, biphenyl, diphenylacethylene, styrene, acrylonitrile, pyrrole or thiophene and derivatives thereof (substituted with a halogen atom, hydroxyl group, sulfonic acid group, nitro group, nitroso group, amino group, carboxyl group or the like); creosote oil, ethylene bottom oil, natural gas or heavy oil of coal or petroleum type. The carbon material can be prepared by converting the above material into a gas-like or dewdroplike state, pyrolyzing the converted material under nonoxidation atmosphere and depositing the thus formed material on the periphery of fine core particles.

The pyrolysis of the above hydrocarbon or derivative thereof is performed in the presence of fine core particles that engage in catalytic action in gas phase. The fine core particle suitably has a diameter of about 10 to 150 nm. Preferably it comprises a metal selected from the group consisting of VIII group elements such as iron, nickel, cobalt, ruthenium, rhodium, palladium, osmium, iridium and platinum or an alloy or a compound thereof. More preferably the fine core particles are formed of either organic or inorganic compounds of nickel such as nickel sulfate, nickel carbonate, nickel chloride, nickel sulfate, nickel oxide, nickel nitrate, nickel oxalate, nickel acetate, nickel formate, nickel benzoate, nickel stearate, nickel phosphinate, nickel phosphate and nickel pyrophosphate.

Compounds having a particle diameter of 100 meshes or less are used in the following embodiments. In actuality, the compounds are decomposed before carbon begins to deposit. The particle diameter of the starting compound does not exert a large influence.

Such fine core particles form approximately at the center of the carbon material in the pyrolysis of hydrocarbons while depositing the pyrolyzed carbon on the periphery of the fine core particles. When a fine core particle is present that forms a catalyst in the above gas phase pyrolysis, the crystallinity of the carbon material can be made higher with the catalysis. In such case, preferably the content of core particles relative to the carbon is 0.005 to 10 atm%. When the content is 0.005 atm% or less, the effect of the catalyst is insufficient. When the content is 10 atm% or more, the relative quantity of the carbon becomes smaller, which results in insufficient capacity of a battery.

The conditions for the pyrolysis which can be expected to provide catalysis are as follows. The material in gaseous or dewdrop state is supplied to a reactor at a temperature lower than the temperature of starting pyrolysis at a flow rate of 0.5 to 50 cm/minutes and at a supply rate of about 0.05 to 20 mol/cm. The pyrolysis can be conducted in two stage temperature regions. The first stage temperature region ranges between room temperature to 1000° C., preferably from about 300° to 900° C. The second stage temperature ranges from about 650°0 to 1300° C., preferably from about 750° to 1200° C. The pyrolysis is performed while heating the two temperature regions at a rate of about 0.1 to 20° C./minutes. The mode for raising the temperature need not be at an equal rate, but may be a zigzag multi-stage raising, slow-raising at the first stage followed by rapid-raising, rapid-raising at the first stage followed by slow-raising, maintaining a certain level midway followed by raising and once lowering in the midway followed by raising again. Furthermore the supply rate and the flow rate of the material in gaseous or dewdrop state need not be constant and can vary in the above mentioned ranges. The temperature can be elevated or lowered either step by step or in a continuous manner within the above ranges. Thus an infinite number of combinations can be present depending on the temperature raising mode, or the supply rate and the flow rate of the material in gaseous or dewdrop state. The appropriate combination can be appropriate selected depending on the kind of materials.

However, it would be important to conduct gas pyrolysis utilizing the catalytic action of fine core particles in two-stage temperature regions and under the predetermined temperature raising mode. The reason for this is not necessarily clear but, it seems that the two processes, the process of segmenting fine metal core particles to form a fine core particle in approximately the center of carbon and the process of stacking carbon on the fine core particle in spherical particle configuration, are occurring simultaneously, or either intermittently or continuously.

When iron, nickel or cobalt is supplied into the system in the form of its compound, a fine core particle with an appropriate size can be provided in the carbon material by appropriately selecting the decomposition temperature of the compound as well as the decomposition temperature of its gaseous or dewdrop state. Consequently, the process of segmenting the above fine core particles is necessarily not required, thereby making it possible to perform the pyrolysis in selected and definite temperature regions. Among the above fine core particles, nickel is the most preferable. In particular, supplying nickel that constitutes fine core particles in the form of compound is preferable because the carbon material produced in the above process has excellent performance and the yield.

Thus an appropriate control of the temperature and the time thereof can provide the carbon material having the most preferable crystal surface spacing and .the size of crystals.

The carbon materials thus prepared are used as the anode active material. At this time, these carbon materials can be used as they are or in admixture with a conductive material and/or binder. The admixture ratio in a cathode can be applied thereto.

The electrolyte applied to the nonaqueous secondary battery of the present invention can be prepared by dissolving a lithium salt in an organic solvent either in the form of a solid or a liquid. For example, organic electrolytic solutions, polymer solid electrolytes, inorganic electrolytes, molten salt or the like can be used. Among them, the organic electrolytic solution is the most preferable. Example of solvents for organic electrolytic solution includes esters such as propylene carbonate, ethylene carbonate, butylene carbonate, diethyl carbonate, τ-butyrolactone or the like, ethers such as substituted tetrahydrofuran such as 2-methyltetrahydrofuran, dimethylsulfoxide, sulfolane, methylsulfolane, acetonitrile, methyl formate, methyl acetate and the like which may be used singly or in admixture of two or more kinds. Propylene carbonate and an admixture thereof are preferable.

In addition, the electrolytes include lithium salts such as lithium perchlorate, lithium tetrafluoroborate, lithium hexafluoroarsenate, lithium trifluoromethanesulfonate, lithium halide or lithium chloroaluminate. An admixture of two or more kinds of the electrolytes may be used.

The electrolyte thus prepared is dehydrated with active alumina or metallic lithium. The amount of water in the electrolyte is desirably 1000 ppm or less, or more preferably 500 ppm or less, or more preferably 100 ppm or less.

In addition, in place of this dehydration process, dehydrated solute and solvent may be used, or a combination thereof may be further used.

Figure 2:
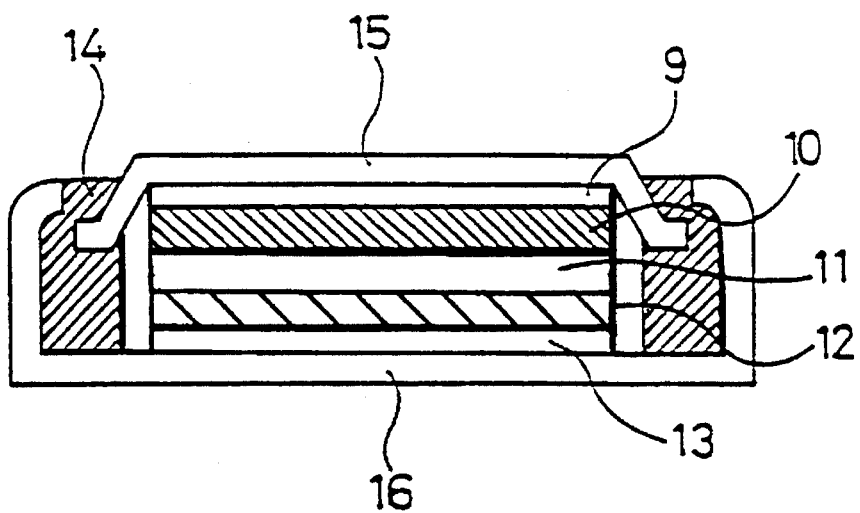
FIG. 2 is a longitudinal sectional view of a coin-type battery.

As shown in FIG. 2, to the cathode 12 and the anode 10 thus prepared is connected when required a collector 9, 13 such as a foil or net made of nickel, aluminum or copper to be further connected to an external electrode. Between the cathode and the anode, the electrolyte, optionally together with a separator 11 such as microporous polypropylene film or a nonwoven cloth made of polypropylene and polyethylene may be disposed. In addition packing or hermetic seal 14 made of polypropylene or polyethylene is provided.

Preferably, the operation of preparing these batteries is conducted in an inert gas like argon gas or extremely dry air separated from the external atmosphere to prevent the infiltration of moisture.

The present invention will be illustrated in conjunction with the following examples, but they are not intended for limiting the scope of the invention.

EXAMPLES

Example 1

Figure 1:
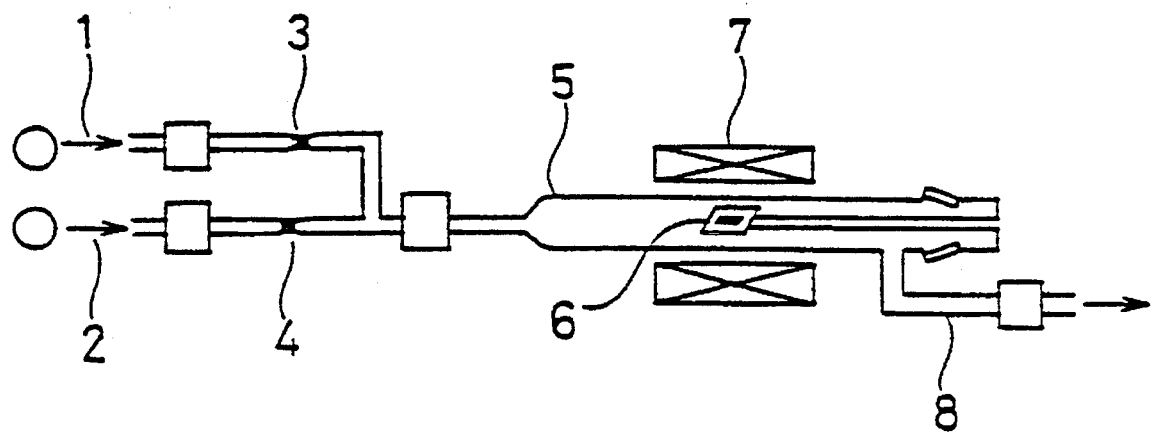
FIG. 1 is a view illustrating the construction of a carbon depositing device for use in a step of a process for preparing a carbon electrode of the present invention.

Nickel oxide powder (having a mesh of 100 or less) 1.8 g was placed on a sample base 6 in a carbon preparing device shown in FIG. 1. Argon gas and propane gas were supplied respectively through a carrier gas supply line 1 and a material gas supply line 2. By manipulating needle valves 3 and 4, the speed of supplying propane gas as a material gas was set to 0.53 mol/h, and the gas flow rate was kept at 25.5 cm/min. The propane gas used as a material was pyrolyzed by changing the temperature at a temperature rising speed of 120° C./min from room temperature to 750° C. and a temperature rising speed of 1° C./min from 750° C. to 1000° C. to give 39.6 g of carbon material powders. The observation of carbon material thus prepared with a transmitting electron microscope showed that the primary particles have an average diameter of 100 nm and these carbon materials enclose nickel particles having an average diameter of 20 to 56 nm at the center thereof, thus forming a concentric spherical structure centering on nickel (see FIG. 3). By the way the particle diameter of an aggregation measured with a laser diffraction particle size distribution meter was 8.0 μm. The reference numerals 5 and 7 in FIG. 1 are schematic representations of a tube and a furnace, respectively.

Polyolefine powder as a binder in a ratio of 5 wt.% was admixed to 20 mg of this carbon material. The mixture was charged in a formed nickel plate, which was pressed under 400 kg/m$^2$ at 160° C. followed by drying in vacuo for 10 hours to prepare a carbon electrode. Then to evaluate this electrode, the electrode was subjected to a charge and discharge test on which a three electrode method was used. That is, it used Li/Li$^+$ as a reference electrode, and 1M LiClO dissolved in a propylene carbonate as an electrolyte. Charge and discharge was performed by setting the charge termination potential to 0 V and discharge termination potential to 2.5 V. The result is shown in Tables 1 and 2.

TABLE 1-a

| | shape | structure | primary particle diameter (nm) | secondary particle diameter (nm) |
|---|---|---|---|---|
| Exp. 1 | spherical | multiple spherical shell structure | 96 | 12.3 |
| Exp. 2 | spherical | multiple spherical shell structure | 156 | 6.5 |
| Exp. 3 | spherical | multiple spherical shell structure | 68 | 10.5 |
| Exp. 4 | spherical | multiple spherical shell structure | 151 | 30 |
| Exp. 5 | spherical | multiple spherical shell structure | 72 | 14 |
| Exp. 6 | spherical | multiple spherical shell structure | 132 | 12 |
| Exp. 7 | spherical | multiple spherical shell structure | 84 | 15.7 |

TABLE 1-b

| | d (002) (nm) | Lc (nm) | La (nm) | core particle | core particle diameter (nm) | discharge capacity (mAh/g) |
|---|---|---|---|---|---|---|
| Exp. 1 | 0.338 | 10.3 | 19.4 | Ni | 18–48 | 199 |
| Exp. 2 | 0.338 | 24.5 | 23.2 | Ni | 65–145 | 180 |
| Exp. 3 | 0.338 | 17.2 | | Fe | 23–48 | 174 |
| Exp. 4 | 0.34 | 8 | 16 | Ni | 56–83 | 182 |
| Exp. 5 | 0.337 | 12.5 | 22.2 | Ni | 15–52 | 221 |
| Exp. 6 | 0.339 | 8.5 | 14.2 | Ni | 31–74 | 172 |
| Exp. 7 | 0.336 | 5.1 | | Co | 20–55 | 171 |

TABLE 1-c

| | shape | structure | primary particle diameter (nm) | secondary particle diameter (μm) |
|---|---|---|---|---|
| Com. Exp. 1 | spherical | multiple spherical shell structure | 41 | 0.2 |
| Com. Exp. 2 | spherical | multiple spherical shell structure | 60 | 0.25 |
| Com. Exp. 3 | indefinite | ribbon-like | | 0.3 |
| Com. Exp. 4 | fibrous | coaxial cylindrical | | 0.2, 2.54 |
| Com. Exp. 5 | spherical | lamellar structure | 400 | 6 |
| Com. Exp. 6 | indefinite | non-orientation | 700 | |
| Com. Exp. 7 | spherical | lamellar structure | 400 | 6 |
| Com. Exp. 8 | spherical | non-orientation | 3000 | |
| Com. Exp. 9 | fiber | coaxial cylindrical | | |
| Com. Exp. 10 | fiber | radial | | |
| Com. Exp. 11 | fiber | non-orientation | | |
| Com. Exp. 12 | indefinite | | 5000 | 41 |

TABLE 1-d

| | d (002) (nm) | Lc (nm) | La (nm) | core particle | core particle diameter (nm) | discharge capacity (mAh/g) |
|---|---|---|---|---|---|---|
| Com. Exp. 1 | 0.37 | 0.9 | | none | | 148 |
| Com. | 0.358 | 2 | 19.4 | none | | 156 |

TABLE 1-d-continued

| | d (002) (nm) | Lc (nm) | La (nm) | core particle | core particle diameter (nm) | discharge capacity (mAh/g) |
|---|---|---|---|---|---|---|
| Exp. 2 Com. | 0.341 | 11 | — | — | | 108 |
| Exp. 3 Com. | 0.345 | 3.2 | — | — | | 124 |
| Exp. 4 Com. | 0.349 | 1.3 | — | — | | 117 |
| Exp. 5 Com. | 0.374 | 1.1 | — | — | | 76 |
| Exp. 6 Com. | 0.344 | 17.3 | — | — | | 113 |
| Exp. 7 Com. | 0.352 | 1.7 | — | — | | 75 |
| Exp. 8 Com. | 0.338 | 22 | 25.1 | — | — | 150 |
| Exp. 9 Com. | 0.37 | 3.5 | — | — | | 100 |
| Exp. 10 Com. | 0.344 | 2.3 | — | — | | 70 |
| Exp. 11 Com. | 0.339 | 90 | 62 | — | — | 60 |
| Exp. 12 | | | | | | |

As the capacity, values at 0 to 0.5 V are given (values at 0 to 2.5 V are given in comparative examples 7 through 11.

TABLE 2

| | discharge capacity (mAh) | | average voltage |
|---|---|---|---|
| | 10 cycles | 50 cycles | (V) |
| Example 8 | 8.8 | 8.7 | 3.71 |
| Example 9 | 9.4 | 9.2 | 3.69 |
| Example 10 | 9.2 | 8.8 | 3.73 |
| Example 11 | 9.0 | 8.9 | 3.75 |
| Example 12 | 9.5 | 9.2 | 2.98 |
| Example 13 | 8.9 | 8.7 | 2.92 |
| Comparative Example 13 | 6.0 | 5.7 | 3.57 |
| Comparative Example 14 | 7.2 | 6.9 | 3.56 |
| Comparative Example 15 | 2.9 | 1.5 | 3.35 |

The primary particle diameter in the present invention means the diameter of minimum unit particles that can be observed with a transmitting type electron microscope, and is an average value obtained in the actual measurement of the particles at an accessible portion thereof.

On the other hand, the secondary particle diameter means the diameter of a secondary body formed by the aggregation of the minimum unit of the primary particles, and is given as a value having a peak diameter in the particle size distribution obtained by a laser diffraction particle size analyzer (SHIMADZU CO. SALD-1100).

Methods of measuring the size of crystals using the X-ray wide angle diffraction method include, known methods such as disclosed in Carbon Material Experiment Technique 1, pages 55 to 63 compiled by Carbon Material Society (Published by Science and Technology Publishing Company) and Japanese Laid-Open Patent No. SHO. 61-111907. In addition, the form factor used was 0.9.

Example 2

Carbon was prepared in the same manner as Example 1 except that nickel powder (250 mesh) 1.6 g was used in place of nickel oxide to give 21.6 g of carbon powder. The observation of carbon powder thus obtained with a transmitting type electron microscope showed that they had the same structure as Example 1. Primary particles having a diameter of 112 to 176 nm were observed. The average diameter thereof was 156 nm. Nickel particles in the center had a diameter of 65 to 145 nm. The secondary particles had a diameter of 65 μm as determined by the measurement using a laser diffraction type particle size distribution meter. This carbon powder was used to prepare and evaluate a carbon electrode in the same manner as Example 1.

Example 3

Carbon was prepared in the same manner as Example 1 except that iron oxalate (100 or less mesh) 3.8 g was used in place of nickel oxide to give 18.1 g of carbon powder. The observation of carbon powder thus obtained with a transmitting type electron microscope showed that they had the same structure as Example 1. The primary particles having a diameter of 46 to 72 nm were observed. The average diameter thereof was 68 nm and the iron particles in the center had a diameter of 23 to 48 nm. In addition, the secondary particles had a diameter of 10.5 μm as determined by measurement using a laser diffraction particle size distribution meter. This carbon powder was used to prepare and evaluate a carbon electrode in the same manner as Example 1.

Example 4

Carbon was prepared in the same manner as Example 1 except that iron oxalate (100 or less mesh) 4.6 g was used in place of nickel oxide to give 25.1 g of carbon powder. The observation of carbon powder thus obtained with a transmitting type electron microscope showed that it had the same structure as Example 1. Primary particles having a diameter of 100 to 170 nm were observed. The average diameter thereof was 151 nm and the nickel particles in the center had a diameter of 52 to 83 nm. In addition, the secondary particles had a diameter of 30 μm as determined by measurement using a laser diffraction particle size distribution meter. This carbon powder was used to prepare and evaluate a carbon electrode in the same manner as Example 1.

Example 5

A mixture of 3.1 g of nickel nitrate (100 mesh or less) in place of nickel and 1.3 g of and nickel oxide (100 mesh or less) was used to prepare carbon by subjecting to pyrolysis at the same gas flow rate equal to Example 1 for 3 hours at 850° C., thereby providing 41.3 g of carbon powder. The observation of carbon thus given with a transmitting type electron microscope showed that the carbon had a structure similar to Example 1. In the observation, it was made clear that the primary particle had a diameter of 55 to 87 nm, or an average diameter of 72 nm and the nickel particle in the center had a diameter ranging from 15 to 52 nm. In addition, the second particle had a diameter of 14 μm as determined by measurement using a laser diffraction type particle size distribution meter. This carbon powder was used to prepare and evaluate a carbon electrode in the same manner as Example 1.

Example 6

Nickel oxide powder (100 mesh or less) 1.8 g was placed on a sample base 6 of a carbon preparing device shown in FIG. 2 and benzene was used as material gas to operate the device so as to provide 0.15 mol/hr of benzene and a gas flow rate of 25.3 cm/min. The temperature rising profile was set to 12° C./min. from room temperature to 700° C., and 1.4° C./min. from 700° to 950° C. The material benzene was pyrolyzed to prepare carbon to provide 32.7 g of carbon powder. The observation of carbon thus prepared with a transmitting type electron microscope showed that the carbon had the same structure as Example 1, the primary particle had a diameter ranging between 80 to 152 nm, and an average diameter of 132 nm, and the nickel powder in the center had a diameter ranging between 31 to 74 nm. In addition, as determined by measurement using a laser diffraction particle size distribution meter, the second particle had a diameter of 12 μm. This carbon powder was used to prepare and evaluate a carbon electrode in the same manner as Example 1.

Example 7

Carbon was prepared in the same manner as Example 1 except that cobalt oxalate powder (100 mesh or less) 4.6 g was used in place of nickel oxide powder to provide 18.1 g of carbon powder. The observation of carbon thus given with transmitting type electron microscope showed that the carbon had the same structure as Example 1. In the observation it was made clear that the particle had a diameter ranging from 52 to 113 nm, the particle had an average diameter of 84 nm, and the cobalt particle in the center had a diameter ranging from 20 to 55 nm. In the measurement using a laser diffraction type particle size distribution meter the secondary particle has a diameter 15.1 μm. This carbon powder was used to prepare a carbon electrode in the same manner as Example 1.

Example 8

The carbon material 50 mg prepared in Example 1 was used to prepare a carbon electrode, which was used as an anode. This was followed by pressuring and molding 300 mg of an admixture of 80 parts by weight of $LiCoO_2$, 10 parts by weight of acetylene black as a conductive material and 10 parts by weight of polytetrafluoroethylene powder as a binder to prepare a pellet having a diameter of 15 nm and drying such pellet in vacuo for 12 hours or more thereby providing a cathode. As an electrolyte was used an electrolyte solution consisting of 1M LiClO dissolved in a propylenecarbonate. Furthermore a polypropylene-made non-woven cloth was used as a separator to prepare a coin type battery as shown in FIG. 2. Charge and discharge test was performed by setting a charge termination voltage to 4.1 V, a discharge termination voltage to 2.7 V (3.3 V to 1.5 V in Examples 12 and 13) and a current value to 1 mA to determine an average voltage and discharge capacity from the 10th cycle of the discharge curve. Table 2 shows the result of the test.

Example 9

A coin type battery was prepared in the same manner as Example 8 except that Example 1 of carbon was used as a carbon material for an anode and as an electrolyte was used a solution in which $LiPF_6$ was dissolved at a ratio of 1 mol $dm^{-3}$ to a solvent propylenecarbonate and diethylcarbonate and methyltetrahydrofuran are mixed in a ratio of 5:5:1. Then a charge and discharge test was performed. The result of the test is shown in Table 2.

Example 10

A coin type battery was prepared in the same manner as Example 8 except that the carbon material of Example 1 was used as an anode material, a synthetic fluorine rubber was used as a binder of an anode, and as an electrolyte was used an electrolyte solution consisting of 1M LiClO dissolved in a 50/50 volume percent mixture of propylenecarbonate and diethylcarbonate. Then a charge and discharge cycle test was performed.

Example 11

A coin type battery was prepared in the same manner as Example 8 except that as a cathode $LiNiO_2$ was used, as an anode the carbon obtained in Example 1 was used and as an electrolyte was used an electrolyte solution consisting of 1M LiClO dissolved in a 50/50 volume percent mixture of ethylenecarbonate and diethylcarbonate. Then a charge and discharge test was performed.

Example 12

A coin type battery was prepared in the same manner as Example 8 except that as a cathode was used $V_2O_5$, as an anode was used the carbon obtained in Example 1 , and as an electrolyte solution consisting of 1M LiClO dissolved in a 50/50 volume percent mixture of propylenecarbonate and diethylcarbonate. Then a charge and discharge test was performed.

Example 13

A coin type battery was prepared in the same manner as Example 8 except that as a cathode was used $MnO_2$, as an anode was used the carbon obtained in Example 1, and as an electrolyte was used an electrolyte solution consisting of 1M LiClO dissolved in a 50/50 volume percent mixture of ethylenecarbonate and diethylcarbonate.

Example 14

A coin type battery was prepared in the same manner as Example 8 except that as a cathode was used $LiMnO_2$, as an anode was used carbon obtained in Example 3 and as an electrolyte was used an electrolyte solution consisting of 1M LiClO dissolved in a 50/50 volume percent mixture of propylenecarbonate and diethylcarbonate. Then a charge and discharge cycle test was performed.

Comparative Example 1

Soot generated by an incomplete combustion of propane gas at 1200° C. was deposited on a quartz bar, which was collected to be used for the evaluation of the carbon material. The observation of the carbon with a transmitting type electron microscope showed that the carbon particles were spherical. Primary particles having a diameter of 21 to 65 nm were observed and the average particle diameter thereof was 41 nm. The secondary particles had a diameter of 0.2 μm as determined by measurement using a laser diffraction type particle size distribution meter. This carbon powder was used to prepare and evaluate a carbon electrode in the same manner as Example 1.

Comparative Example 2

Figure 4:
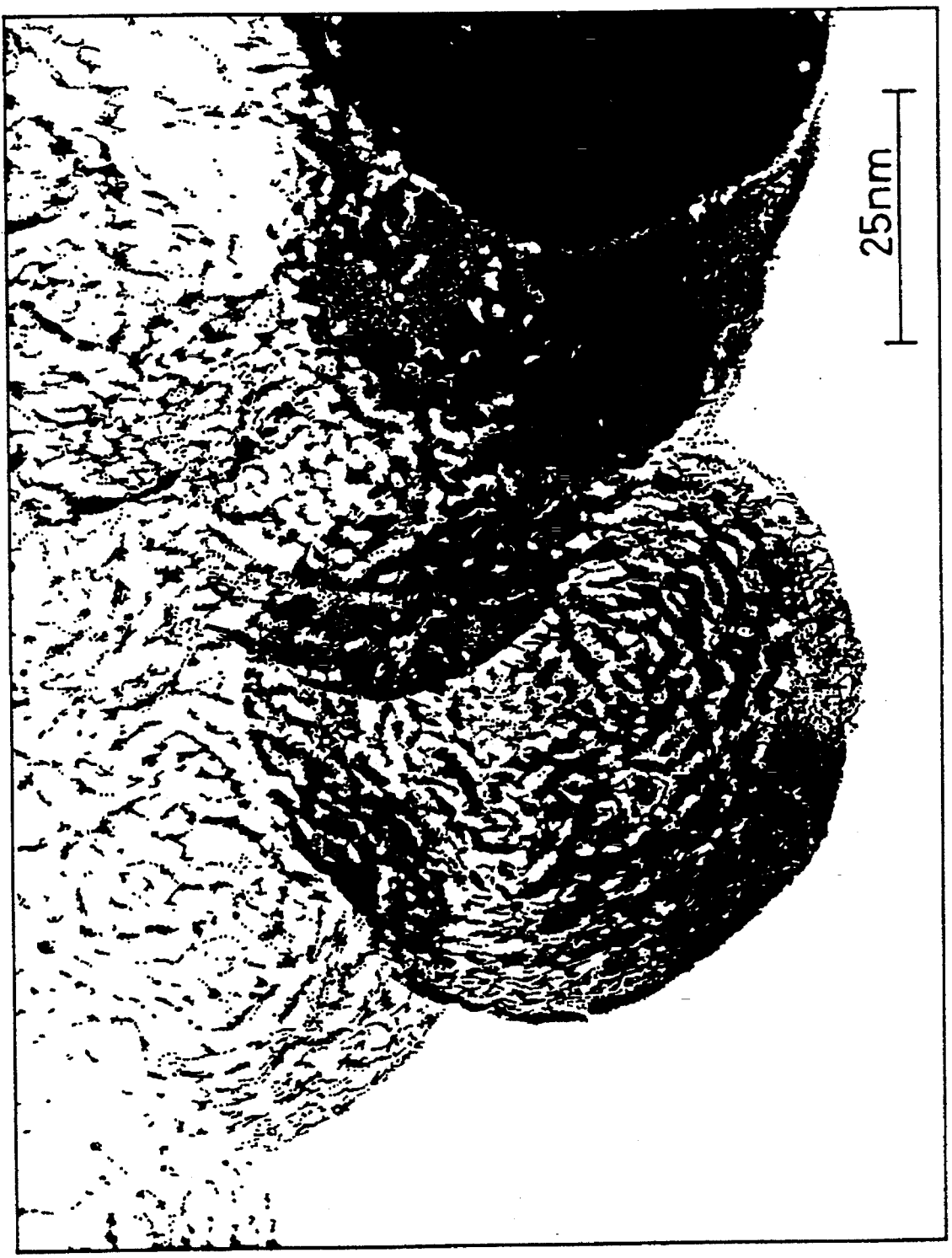
FIG. 4 is a TEM micrograph of a carbon material having a concentric and spherical structure (onion-like structure) and prepared in accordance with a comparative example of the present invention.

Ethylene bottom oil was incompletely combusted at 1800° C. to prepare a carbon black, which was used as a carbon material for evaluation. The observation of this carbon with a transmitting type electron microscope showed that carbon particles were spherical. Primary particles having a diameter 43 to 106 nm were observed and the average diameter thereof was 60 nm. In addition, these spherical primary particles had incomplete concentric spherical structure as shown in FIG. 4. The secondary particles had a diameter of 0.025 μm as determined measurement using a laser diffraction particle size distribution meter. This carbon material was used to prepare and evaluate a carbon material in the same manner as Example 1.

Comparative Example 3

Carbon black used in Example 2 was subjected to 12 hours heat treatment at 2800° C. to provide a carbon material to be used for evaluation. The observation of this carbon material with a transmitting type-electron microscope showed that no spherical particles were formed and the carbon material had a hollow distorted shape accompanied by an advanced crystallization.

Comparative Example 4

Vapor growth carbon fiber subjected to heat treatment at 1000° C. was fragmented into small pieces to provide a carbon material. The observation of this carbon with a transmitting type electron microscope showed that the carbon had a fibrous configuration with an average thickness of 180 nm. Fine metal particles were observed on portions which can be regarded as a tip of fiber at the time of the growth thereof. Fine particles at the tip can be regarded as iron or a carbonated iron as seen from the fact that in the measurement using a laser diffraction particle size distribution meter the average particle diameter has two peaks of 0.20 and 2.54 μm. This carbon powder was used to prepare and evaluate a carbon electrode in the same manner as Example 1.

Comparative Example 5

Mesocarbon microbeads (products carbonated at 1000° C.) were used as a carbon material for evaluation. The observation of this carbon material with a transmitting type electron microscope showed that the primary particle of the carbon had an average diameter of 400 nm. In the measurement using a laser diffraction particle size distribution meter the second particle diameter had a diameter of 6 μm. This carbon powder was used to prepare and evaluate a carbon electrode in the same manner as Example 1.

Comparative Example 6

Activated carbon was fractured with a ball mill to be used as an active material. The observation of the activated carbon with a laser diffraction particle size distribution meter showed that the average diameter was 3.7 μm. This carbon was used in the same manner as Example 1 to prepare and evaluate a carbon electrode.

Comparative Example 7

Mesocarbon microbeads used in Comparative Example 5 were subjected to 12 hours heat treatment at 2000° C. to provide a carbon material for evaluation. The observation of these microbeads with a transmitting type electron microscope showed that the primary particle of carbon had an average particle diameter of 400 nm. This carbon powder was used to prepare and evaluate a carbon electrode in the same manner as Example 1.

Comparative Example 8

A spherical glassy carbon was used as a carbon material for evaluation. Measurement of these carbon materials with a laser diffraction type particle size distribution meter showed that the carbon had an average diameter of 13 μm. The carbon material was used to prepare and evaluate a carbon electrode in the same manner as Example 1.

Comparative Example 9

A pitch base carbon fiber (subjected to 2600° C. heat treatment) having an axial orientation (coaxial cylindrical structure) was used as a carbon material for evaluation. This carbon fiber 20 mg was bunched with a Ni line and dried in vacuo for 10 hours at 120° C. to prepare and evaluate a carbon electrode in the same manner as Example 1.

Comparative Example 10

A pitch based carbon fiber (subjected to 2600° C. heat treatment) having an axial orientation (radial orientation structure) was used as a carbon material for evaluation. This carbon fiber (20 mg) was bunched with a Ni line and dried in vacuo for 10 hours at 120° C. to prepare and evaluate a carbon electrode in the same manner as Example 1.

Comparative Example 11

An active carbon fiber (heat treated at 2000° C.) was used as a carbon material for evaluation. This carbon fiber was used to prepare and evaluate a carbon electrode in the same manner as Comparative Example 5.

Comparative Example 12

A device similar to the one used in Example 1 was used to deposit carbon on nickel powders (having an average diameter 3 μm). As a material proprane gas was used while as a carrier argon gas was used. At a supply rate of 0.38 mol/hr and at a gas flow rate of 25.5 cm/hr, carbon was deposited for 40 minutes at a deposition temperature of 950° C. to produce 1 g of nickel powders and 1.35 g of carbon powders. Microscopic observation of a carbon material thus obtained with a transmitting type electronic microscope showed that 1 to 3 μm nickel powder was present. Carbon was deposited in such a manner that it covers the nickel powder, but no particular orientation was observed. The size of the secondary particle measured with a laser diffraction particle size distribution meter was 41 μm. Carbon material powder thus obtained was used to prepare and evaluate a carbon electrode in the same manner as Example 1.

Comparative Examples 13 through 15

A coin type battery was prepared in the same manner as Example 8 except that carbon in Comparative Examples 3, 5, and 8 was used as a carbon material for anodes respectively in Comparative Examples 13, 14 and 15, followed by performing a charge and discharge test.

Thus as described above, the effective area of contact with an electrolyte in an electrolyte reaction can be enlarged by using an approximately spherical carbon particle having a diameter of 5 μm or less centering on the fine core particle. This facilitates intercalation and deintercalation between carbon layers on which the graphite-like layer is stacked.

Owing to an increased ratio of carbon thus used, the capacity can be enlarged.

Furthermore, with respect to the carbon material having a concentric spherical structure (onion-like structure) whose fine construction is not complete, the graphite-like layer of carbon arranged in a concentric configuration centering on the fine core particle thereof has a small width of the mean of interlayer spacing of (002) plane. This facilitates the intercalation and deintercalation of lithium between layers and further facilitates the diffusion of lithium into the graphite-like layer.

Still further, the fine core particle having a catalyst action in the pyrolysis of carbon materials is added to increase the reaction rate and the crystallinity of carbon materials. Consequently, the crystal structure of graphite-like layer approximates a graphite structure so that the quantity of intercalation and deintercalation between lithium layers increases and the durability thereof can be improved owing to the stable structure.

What is claimed is:

1. A nonaqueous secondary battery comprising
a cathode, an anode and a nonaqueous electrolyte disposed and sealed between the cathode and the anode wherein the anode is made of a carbon material as its active material, in which the carbon material comprises fine core particle of a metal or an alloy thereof, and a carbon layer which is arranged and stacked in an onion-like shell configuration centering on each fine core particle,
at least part of the carbon layer having a crystal structure in which graphite-like layers are stacked and the fine core particles having an average diameter of about 10 to 150 nm.

2. A nonaqueous secondary battery according to claim 1 wherein the fine core particles comprises VIII element or an alloy thereof.

3. A nonaqueous secondary battery according to claim 2 wherein the VIII element is iron, nickel or cobalt.

4. A nonaqueous secondary battery according to claim 1 wherein the carbon material is formed of primary particles having an average diameter of about 40 to 200 nm.

5. A nonaqueous secondary battery according to claim 4 wherein the primary particles form a secondary body having a size of about 0.1 to 80 μm.

6. A nonaqueous secondary battery according to claim 1 wherein the crystal structure has about 0.336 to 0.360 nm as mean of interlayer spacing of (002) plane spacing determined by the X ray wide angle diffusion method, about 10 to 25 nm as mean crystallite size in the (002) plane direction and about 10 to 25 nm as mean crystallite size in the (110) plane direction.

7. A nonaqueous secondary battery according to claim wherein the content of the fine core particles in the carbon material is about 0.005 to 10 atm%.

* * * * *